Nov. 6, 1934.         R. A. SCHAFER         1,979,710
DUAL CONTROL FOR HYDRAULIC TRANSMISSION
Filed Nov. 26, 1931      3 Sheets-Sheet 3
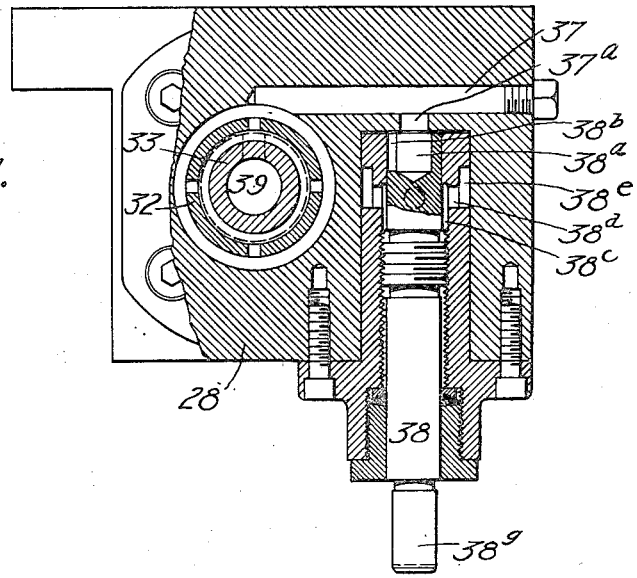
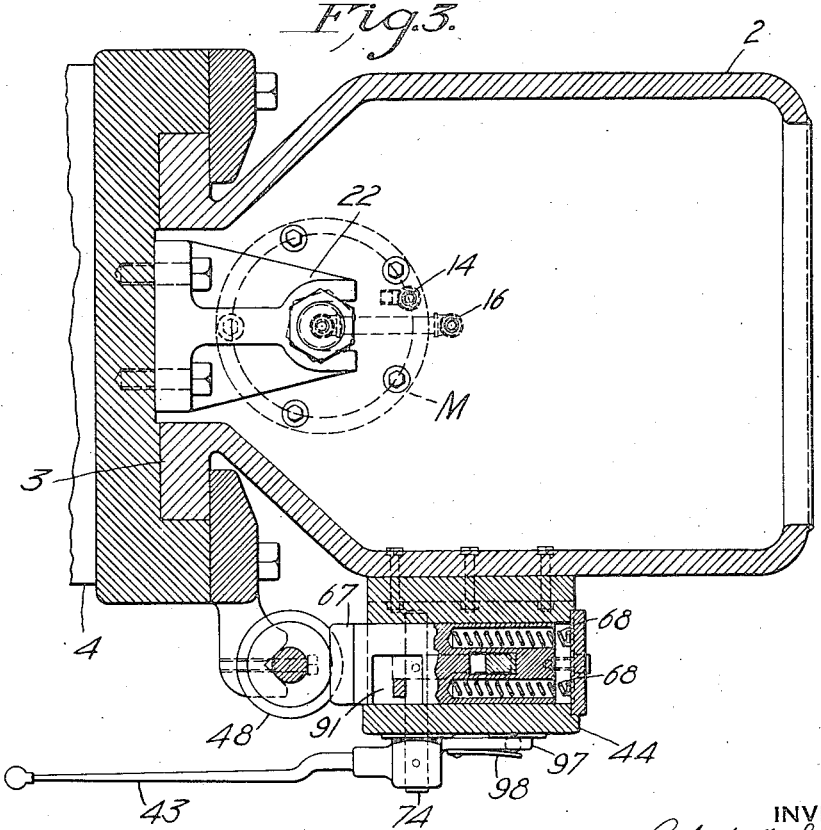
INVENTOR
Robert A. Schafer
BY ATTORNEY
Nathan, Bowman & Helferich Patented Nov. 6, 1934

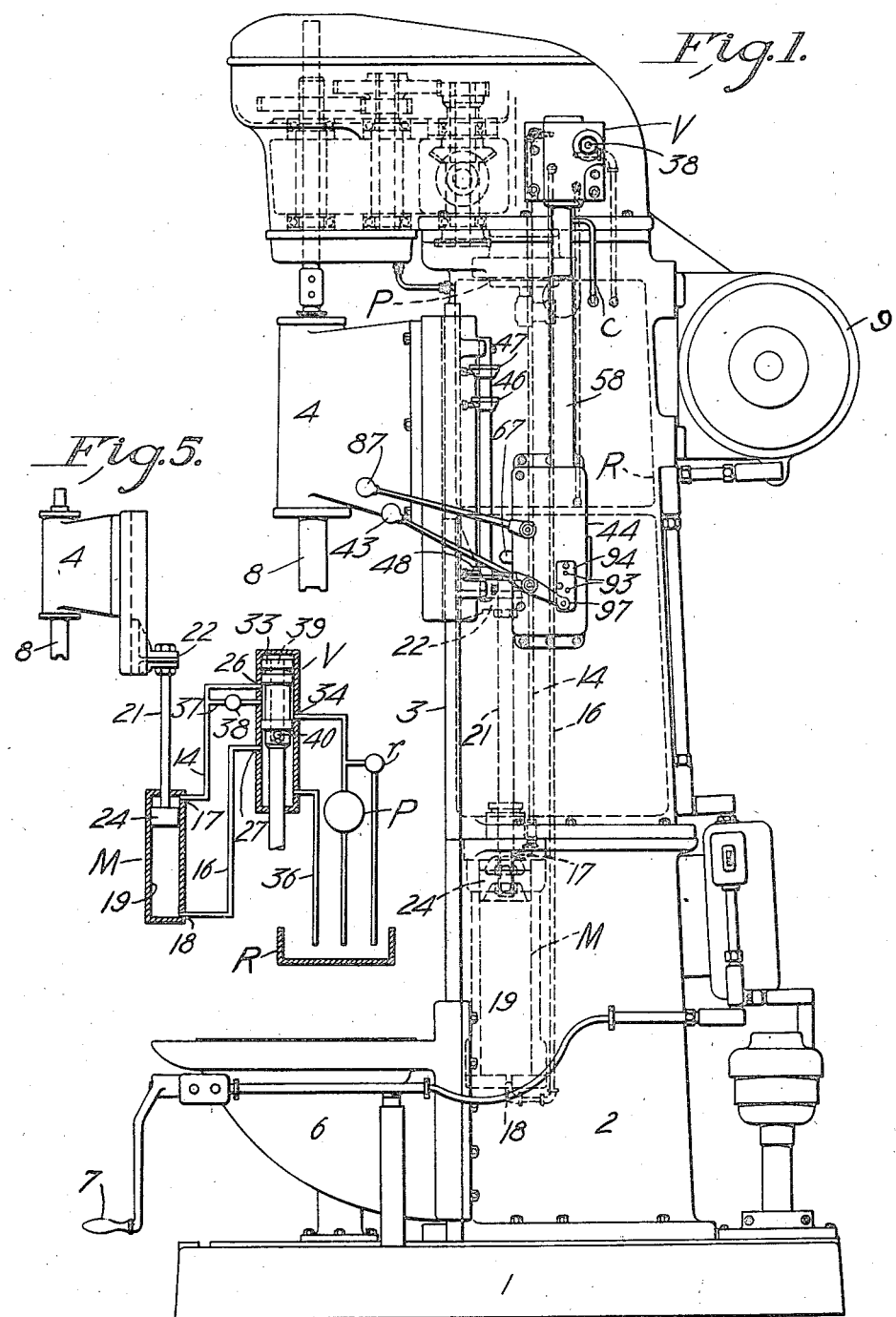

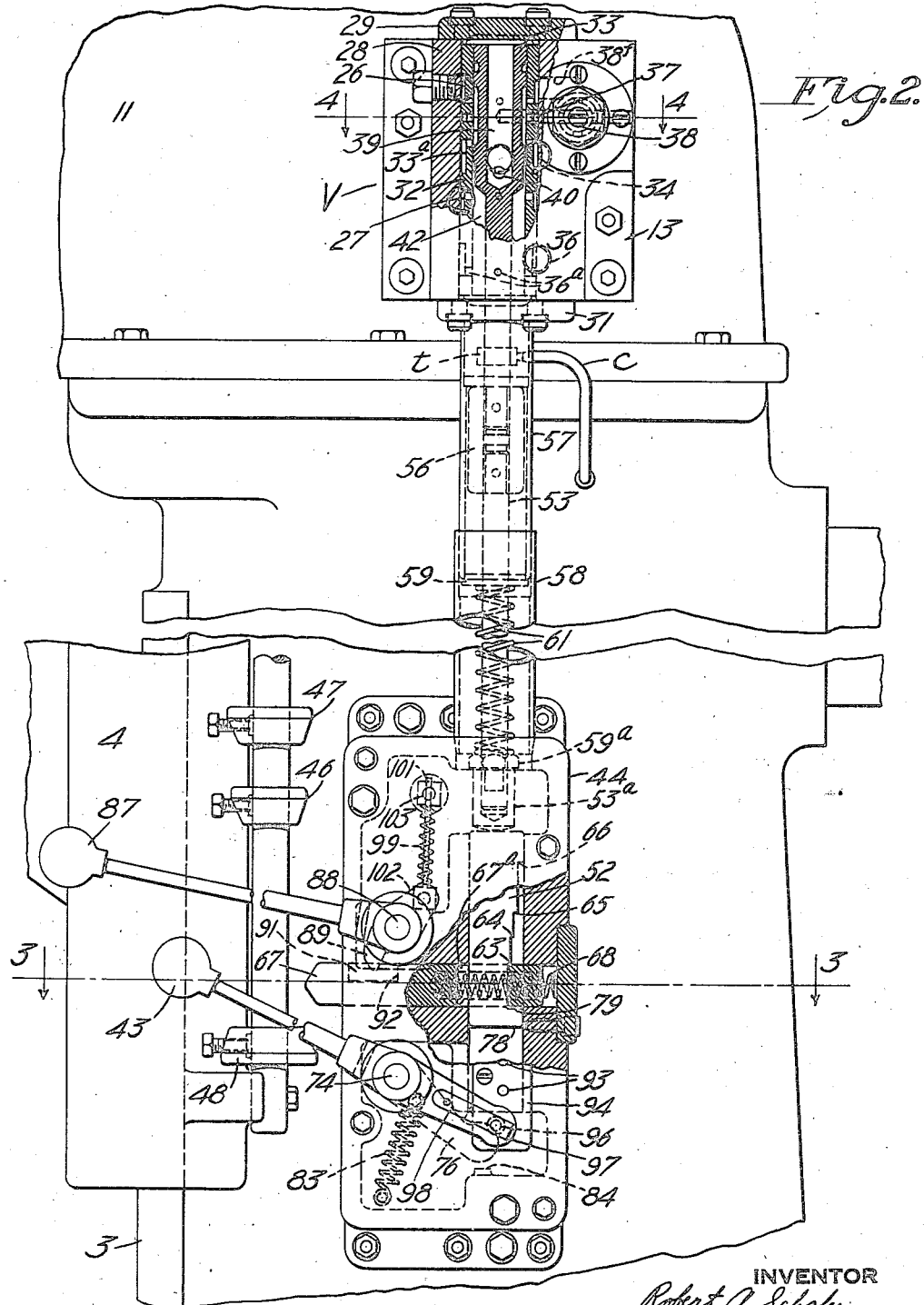

1,979,710

UNITED STATES PATENT OFFICE 1,979,710

DUAL CONTROL FOR HYDRAULIC TRANSMISSION

Robert A. Schafer, Richmond, Ind., assignor to The National Automatic Tool Company, Richmond, Ind., a corporation of Indiana Application November 26, 1931, Serial No. 577,405

2 Claims. (Cl. 77—32)

This invention relates to machine tools in general and is more particularly concerned with the means for controlling the movements of the tool or work spindle, as the case may be, of such machines. In its more specific aspects this invention is particularly adapted to machine tools of the hydraulically propelled type and for the purpose of this disclosure reference is made herein to an upright drill as one style of machine best illustrating the various features of this invention.

In that type of machine a normal cycle of operation of the spindle is rapid traverse down or forward until the point of the tool is about to engage the work-piece. At this point the power feed is thrown in and the spindle continues its forward movement at a feed rate until the desired depth of hole is reached whereupon the forward feed is stopped and the reverse traverse is thrown in. The tool spindle, or spindle and head in some machines, then recedes rapidly from the work, proceeds to its initial starting position and comes to rest. Other cycles of operation are frequently used, depending largely upon the requisites of the tooling operation and the character of each work-piece but the cycle just explained is perhaps the most common and will serve to illustrate the problem that this invention is concerned with.

One of the main objectives of the machine tool designer is to reduce operating time to a minimum and thereby reduce the overhead expense and increase correspondingly the production capacity of each unit. With that end in view various automatic tripping mechanisms have been designed which when actuated by an adjustable dog or dogs, carried usually by the shiftable member, render the several feed and traversing mechanisms effective at predetermined points in the travel of the spindle or head.

It is desirable, if not essential, to provide means whereby the operator can interrupt or discontinue the forward movement of the tool, at will or in cases of emergency, and in the constructions heretofore developed the emergency release mechanisms customarily operated to stop the advance of the tool and to effect a separation or retraction of the parts to their initial starting position. When the machine is again started the sequence of operations is started anew, even though the original work-piece upon which the tool was operating when thrown into reverse movement, is partially completed. As a consequence, there is considerable time and idle movement wasted after each reversal of this character, before the tool and work-piece are again brought into the position status quo ante.

A primary object of this invention is to provide a machine with automatic control mechanism and with means whereby, not only can the operator effect an instantaneous stopping of the forward movement of the tool and/or return the tool head to its normal position of rest at any point during this cycle, but also to again restore, under the manual control of the operator, the relative position that had existed between tool and work when the emergency stop means was actuated, without first proceeding through the various steps of the pre-arranged automatic cycle.

A further object of this invention is to provide means whereby the movement of an element may be controlled automatically in combination with means for rendering the automatically actuated devices ineffective in whole or in part. And as an additional refinement, the provision of means whereby the operator may exercise complete control over the movements of the elements irrespective of the position of the trip dogs, etc., of the automatic control means. By way of illustration, certain classes of work may not require a production set up of the machine tool, and it not infrequently happens that during a run of production work it is necessary to withdraw a machine temporarily for certain special work or rush order and heretofore, such withdrawals incurred serious delays and held up production primarily because of the time consumed in again setting up the machine for the incompleted production work.

A further objective of this invention is to provide means whereby a machine tool may be quickly and easily withdrawn from the production line, converted into a general purpose machine, and utilized to perform tooling operations on individual pieces or for other special purposes without disturbing or effecting its original set up. It will be perceived, therefore, that not only can the one machine be readily converted from a production machine to a general purpose machine, and vice versa, but that there is no time wasted in making the change over.

Still another object of this invention is to provide means for suspending the action of the automatic trip mechanism at the will of the operator at any point during the cycle of operations and to arrange the parts so that the automatic control devices remain ineffective until such time as they are positively thrown into operative relation with their cooperating elements.

In the prior constructions manually operated means usually were provided for stopping the forward movement and returning the tool carrier to its initial starting position, if the tool should break, or encounter a resistance during the tooling operation beyond its normal capacity. When work on the unfinished piece is again resumed the tool spindle or tool carrier must necessarily pass through the same cycle as before, even though there is but a small fraction of the tooling yet to be completed, consequently there is a great deal of time lost in completing the work.

This invention proposes a means for overcoming this disadvantage by arranging the controls for the fluid control valve or change speed mechanism in a manner whereby they may be actuated manually to effect a varied cycle entirely independently of the automatic tripping mechanism so that, for example, the operator can regulate the power transmission to bring the tool rapidly into close proximity with the bottom of the hole, and then render the automatic control means effective during the remainder of the tooling operation.

To accomplish this objective in accordance with this invention it is proposed to provide two manually actuable control levers, one of which is arranged to serve as the emergency trip lever that stops and reverses the movements of the tool head, while at the same time, also renders the automatic control means ineffective for future automatic control until the emergency lever is reset, and the other lever being arranged for manual operation of the change speed mechanism, both the rate and direction of movement, whenever the automatic means is rendered ineffective.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of an illustrative form of machine tool incorporating the present invention. Fig. 2 is an enlarged view of a portion thereof, showing particularly the manual and automatic control mechanism and the rate and direction control means actuated thereby. Figs. 3 and 4 are sectional views along the lines 3—3 and 4—4 respectively of Fig. 2. Fig. 5 is a diagrammatic view of the hydraulic circuit.

Referring particularly to the drilling machine depicted in Figure 1 the numeral 1 represents the base member upon which a two-part column 2 is supported. The forward face of the column is provided with vertical guideways 3 upon which a slidable tool head 4 and an adjustable work table 6 are mounted, the position of latter being capable of adjustment by a removable crank handle 7 in a conventional manner.

The tool head 4 is provided with a rotatable drill spindle 8 which is driven by suitable change-speed mechanism (not shown) that are encased within the housing 11 at the top of the column, and receives power from a suitable motor 9 supported upon the side of the column at the upper end thereof.

The traversing and feeding movements of the head 4 is effected by an hydraulic motor M, and in this disclosure fluid (preferably oil) is supplied thereto by pump P removably secured within the top of the column 2, through and under control of a distributing valve V mounted a bracket 13 secured upon the side of the housing 11. From the valve V fluid is directed through either of the pipe lines 14 or 16 to the forward and reverse ports 17 and 18 respectively of the hydraulic motor M located within the column near its base. The return fluid exhausted by the motor is returned to a reservoir R likewise situated within a portion of the column and from which the pump P derives its oil. To guard against excessive pressures in the forward line a suitable relief valve $r$ is included therein which operates to bypass fluid to the reservoir when the pressure in the system exceeds a predetermined maximum.

The connection between the motor M and the tool head 4 is provided by a piston rod 21 adjustably fixed to a bracket 22 of the tool head. The other end of the rod carries the piston 24 slidable in the cylinder 19 in the usual manner. Thus a flow of fluid directed to the motor M through either of the pipes 14 and 16 causes the piston and tool head to be elevated or lowered, as the case may be, and the rate of flow to the cylinder determines whether this movement shall be at a rapid traverse rate or at a slow feed rate.

In the present disclosure the rate and direction control valve V comprises a cylinder or casing 28 fitted with end caps 29 and 31, a sleeve 32 that is provided with fluid passageways leading to inlet and outlet ports, and a slidable valve element 33 fitted within the sleeve.

In addition to the forward and reverse ports 26 and 27, previously mentioned, the casing 28 is provided with a supply port 34 leading from the pump P, a drain port 36$^a$ leading to the reservoir R, and a feed port 37 leading to an adjustable needle valve 38 that also communicates with the forward pipe line 14. With the valve plunger in the position illustrated in Fig. 2, fluid under pressure enters the port 34, passes around the reduced portion 33$^a$ of the valve plunger and enters the ports 26 and 37, both of which are connected with the forward pressure line 14, and then passes to the small end of the motor M causing the piston thereof and the parts connected therewith to move rapidly forward. The fluid exhausted from the large end of the motor passes through line 16, ports 27, drain ports 36$^a$ to the drain pipe 36 and reservoir R.

If the valve is moved downwardly one position, port 36 is cut off and the output of the pump is directed through port 37 to the needle valve 38. Fig. 4 illustrates the arrangement of conduits establishing the connection with the needle valve and in which a short conduit 37$^a$ leads from the conduit 37 to the recess 38$^a$ formed at one end of the valve stem.

One side of the valve stem is cut away as illustrated to form a relatively long and narrow slot 38$^b$ that is adapted to provide communication between recess 38$^a$ and an annular channel 38$^c$ whenever the stem 38 is retracted a distance sufficient to uncover the end of the slot 38$^b$. The fluid permitted to enter the channel 38$^c$ then passes through ports 38$^d$, channels 38$^e$, to conduit 38$^f$ and the forward pressure line 14. The amount of opening of the slot 38$^b$ determines the amount of fluid that is permitted to pass into the forward pressure line and, accordingly, determines the rate of movement of the motor M and the tool spindle connected therewith. The extended portion 38$^g$ of the valve stem furnishes the means for adjusting the degree of opening in the valve to vary the rate of flow therethrough and in practice the usual handle or wheel is removed therefrom in order to prevent unauthorized tampering with the valve. The volume of fluid not passing the valve is, of course, directed to the reservoir through the relief valve $r$ previously mentioned.

The fluid exhausted by the motor during the feed stroke passes to the reservoir through the same conduit and channels herein before referred to in connection with the rapid traverse stroke.

When the valve plunger is moved downwardly one position further, the supply conduit 34 is brought into communication with port 27 and the lower end of the motor cylinder whereupon the motor is propelled in the opposite direction and the tool spindle recedes from the work. The motor exhaust fluid passes through line 14, port 26, through the central bore 39 of the valve plunger, through ports 40 and 36$^a$ and thence to line 36 and the reservoir.

The valve plunger may also assume a "stop" position which is arrived at by moving the valve plunger another step downward, and when in the last mentioned position, the supply fluid entering port 34 passes directly through the central bore 39 of the valve plunger to the reservoir. It will be noted that in this position the fluid remaining in the large end of the motor, in this case the lower end, is trapped therein (port 27 communicating only with the reduced portion formed intermediate the shoulders formed on the valve plunger) thereby sustaining the weight of the tool head and spindle and preventing movement thereof, while at the same time the pump P is relieved of the stresses occasioned by pumping against a resistance and discharges its entire volume substantially pressure free to the reservoir R.

So that accuracy and uniformity of finish on a plurality of similar work-pieces may be obtained, automatically controlled means are provided for effecting movements of the valve which consist primarily of a trip block 52 slidable vertically within a bracket 44 and a cooperating interference member 67. The lower end of the rod 53 engages the block 52 and is provided with an extensible portion 53$^a$ for varying the relationship between the latch bar and valve plunger. For convenience of manufacture and assembling of the parts the valve rod 53 is made in two parts and connected as at 56. The rod 53 and coupling 56 are encased in a protective tubing comprising an upper portion 57 that telescopes a larger lower section 58 secured to the bracket 44. The telescoped end of the tube 57 is provided with a cap 59 that furnishes a stop or seat for a valve actuating spring 61. The other end of the spring exerts a downward pressure against a jam-nut 59$^a$ threaded to the lower end of the push rod, for the purpose of constantly tending to move downwardly the trip block 52 and valve plunger 33.

The movement of the trip block and valve plunger is, however, intercepted by the interference member 67, (see Figs. 1 and 3) that engages successively a series of steps or abutments 63, 64, 65 and 66 formed upon the trip block and projects into the path of movement of the trip dogs 46, 47 and 48 carried by the tool head. The member 67 has a slot 67$^a$ formed therein, through which the stepped bar 52 passes, and is urged constantly outwardly under the force exerted by springs 68 so as to engage the rear face of the slot 67 with the stepped portion of the latch 52.

To start the machine cycle the operator depresses a control lever 43, which is fulcrumed at 74, to cause the free end of lever 76 to engage the under surface 78 of the trip block 52. A further movement of the lever elevates the block until the shoulder 79 thereof contacts with the under surface of the trip plunger 67. This movement, it will be seen, compresses and stores power in the spring 61 for a purpose shortly to be explained and permits the interference bar 67 to move outwardly its full distance or until the upper face of the block engages one of the abutments 63, 64 or 65 formed on the latch bar 52. A contracting spring 83 secured to the lever 76 normally maintains the latter in a withdrawn position against a suitable boss or support 84 provided by the bracket casting.

When the operator depresses the control lever 43 its full distance, thus elevating the latch bar 52 and the valve piston, the trip plunger 67 engages the trip block at step 63, and the piston 33 is moved to the position shown in Fig. 2. Fluid entering the supply port 34 of the valve V flows out of the forward port 26 and is conducted through the pipe line 14 to the forward port 17 of the motor cylinder 19, causing the piston 24 and the tool head 4 to be operated at a rapid traverse rate toward the work-piece. The exhaust from the reverse port 18 of the cylinder is directed through the pipe line 16 to the distributing valve through the reverse port 27, and passes into the reservoir through the chamber 42 and the drain port 36 as explained above.

Just prior to the engagement between the tool and work-piece the rate of movement is automatically changed from the rapid traverse movement to a feed movement by means of the adjustable trip dog 46 which is set to engage the cam face of the outer end portion of the trip plunger 67 and to move it to the right sufficient to permit the shoulder 63 to clear the upper surface of the bar 67. The spring 61 then moves the trip block 52 and the valve piston 33 downward until the step 64 is engaged with the upper surface of the trip plunger. In this position of the piston 33, communication between the supply port 34 and the forward port 26 is blocked and the fluid pressure from the supply port is directed to the feed port 37 leading to a needle valve 38. The setting of the needle valve controls the rate at which fluid is supplied to the motor and accordingly determines the rate of feed of the spindle. The exhaust from the reverse end of the cylinder is conducted to the reservoir, through the drain port 36, as heretofore explained.

The head and spindle continue the forward movement at the feed rate decided upon until the completion of the drilling or tooling operation whereupon a dog 47, also adjustably carried by the head, engages the trip plunger and moves it further to the right. This additional movement of the bar clears the step or abutment 64 and the spring 61 again shifts the bar and valve until the step 65 engages with the plunger 67. In this position of the valve, all communication between the forward port 26 and the feed port 37 is cut off and the fluid pressure from the supply port 34 is directed to the reverse port 27 and the line 16 leading to the large end of the cylinder 19. The flow to the reverse end of the cylinder being unrestricted, the tool head 4 is caused to move at a traverse rate away from the work. During this movement the exhaust from the forward end of the cylinder is conducted to the drain port 36 through the hollow port 39 of the piston 33, the connecting bore 40, chamber 42, and ports 36ª.

Upward movement of the head continues until a dog 48, which has been set to actuate the plunger 67 at or about the initial starting position, engages the trip plunger 67 moving it to the right still further. The block 52 is again released and the step 66 thereof engages the plunger 67. The piston 33 is then moved to a position wherein the supply port 34 is open to the drain port 36 through the hollow passage 39 and the connecting bore 40. It will be noted that movement of the tool head and motor is prevented because in this position of the valve the flow from port 27 is effectively blocked by the piston 33.

Inasmuch as the chamber 42 of the valve is more or less always filled with oil there is a tendency for leakage thereof out of the casing around the valve shaft. In place of the conventional stuffing box around the shaft I have provided a trap in the form of an annular groove $t$ that collects the leaking oil and returns same to the reservoir R through the conduit $c$.

It has been explained heretofore the necessity of the provision of means to enable the operator to stop the movement of the tool head at any point during its cycle and to this end an emergency control lever 87 is provided, which when fully depressed, shifts the bar 67 to the right its full distance thereby releasing the abutments on the latch bar 52 and the spring 61 shifts the valve to the "stop" position.

In order to effect this movement of the trip plunger by actuation of the emergency lever 87, the latter has secured thereto a finger 89 which fits within a recess 91 formed in the plunger 67, and adapted to engage the rear wall 92 thereof. Also connected with the lever 87 there is a second arm 102 which has a spring toggle connection 99 with a stud 101 so that when the lever 87 is rocked about its fulcrum 88, the toggle 99 assists in the movement of the lever 87 and insures the retention of the finger 89 in either of its two positions.

Certain contingencies may arise wherein it is desirable that the movement of the head and spindle be reversed immediately, and in such cases all that is necessary on the part of the operator is to grasp the lever 87 and move same downwardly, first through the feed position which immediately shows the rate of movement and overcomes the momentum of the parts, and then to the rapid traverse up position, that is until abutment 65 engages the bar 67. The valve V is thereby positioned to effect rapid traverse movements of the head in the reverse direction. Upward movement will continue until either the stop dog 48 engages the plunger or the lever 87 is moved further so as to release the shoulder 65.

An important feature of this invention is the provision of means whereby the operator may exercise complete control over the spindle movements, independently of the automatic trip mechanism. With this end in view the above explained toggle or carry-over mechanism performs the added function of maintaining the interference member out of operation whenever the lever is depressed, even though the operator subsequently removes his hand therefrom. The operator may then take hold of lever 43 and shift the valve piston 33 at will to any desired position.

A feature materially aiding the operator in accurately positioning the piston 33 is provided by recesses 93, formed in a plate 94 removably secured to the bracket 44, and adapted to receive a steel ball 96 held within a recess in the arm 97 of the lever 43 by a flat spring 98. The primary purpose of the detent mechanism is to enable the operator to "feel" the ball slide into the successive recesses thereby notifying him that the valve 33 is properly positioned for effecting a given movement. If desired the spring 98 may be of sufficient strength as to hold the lever 43, latch bar 52 and valve 33 in a given position. However, it has been found that if the lever automatically is withdrawn to the position shown in Fig. 2, whenever same is released there is no likelihood of any damage to the machine should the operator inadvertently or accidentally leave the machine in operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine tool combining a stationary support; a tool carrier translatable thereon; fluid pressure means including a constant delivery pump and an hydraulic motor for translating said tool carrier; a distributing valve for controlling the rate of flow of fluid between said pump and motor thereby to control the rate of movement of said carrier; power means for shifting said valve successively to positions effecting changes in the action of said motor; trip mechanism for controlling the action of said power means; a control lever having a lost motion connection with said trip mechanism for shifting said trip mechanism selectively to a normally effective position or to a normally ineffective position; means automatically rendered effective upon the shifting of said trip mechanism to either of its two positions to maintain said mechanism in its shifted position; a second control lever engageable with said valve for controlling the positioning thereof thereby manually to control the movement of said carrier when said trip mechanism has been shifted to its normally ineffective position; and means normally operative to disengage said second control lever from said valve upon the release of said lever by the operator.

2. A drilling machine combining a column; a tool spindle translatably supported thereon; an hydraulic motor for translating said spindle; a source of fluid supply connected with said motor and a distributing valve therefor having a shiftable element for controlling the rate and direction of flow of fluid to said motor; power means normally tending to shift said valve element ultimately to a position whereby said spindle is retracted at a rapid rate; trip mechanism normally effective automatically to control the positioning of said valve element in timed relation with the movement of said spindle; manually operable means for shifting said trip mechanism selectively to a normally effective position or to a normally ineffective position; means automatically effective to maintain said trip mechanism in either of its two positions; a control lever engageable with said valve element for controlling the positioning thereof thereby manually to control the movement of said spindle when said automatic trip mechanism has been shifted to an ineffective position; and means normally operative to disengage said control lever from said valve element upon the release of said lever by the operator whereupon said power means becomes effective to shift said valve element to a position effecting retraction of said spindle at a rapid rate.

ROBERT A. SCHAFER.